Sept. 20, 1971 G. B. WALL 3,606,097
APPARATUS FOR DISTRIBUTING GRANULAR MATERIAL AND THE LIKE
Filed July 15, 1969
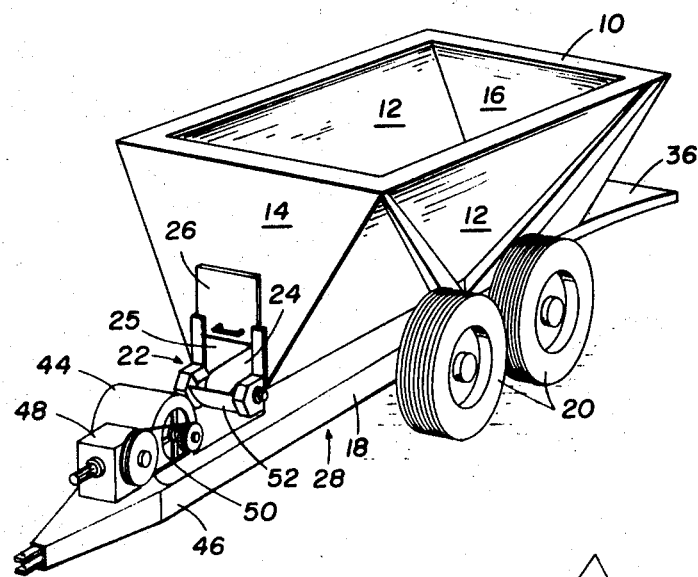
FIG 1
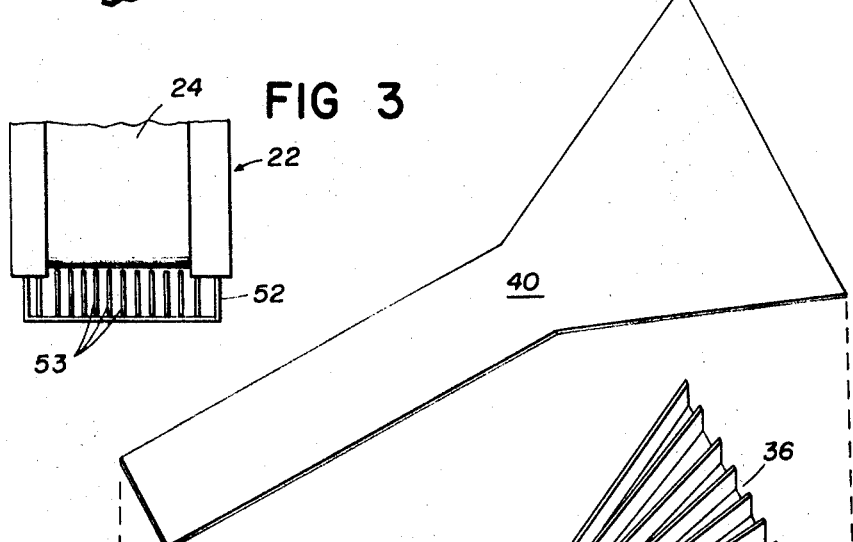
FIG 3
FIG 2
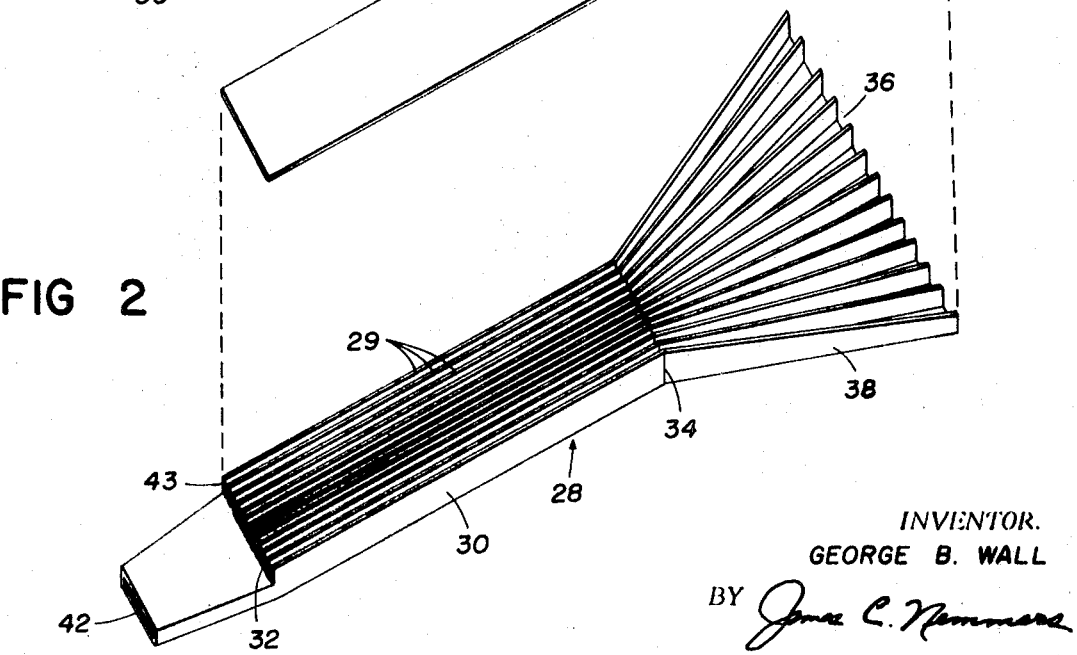
INVENTOR.
GEORGE B. WALL
BY
ATTORNEY 3,606,097
APPARATUS FOR DISTRIBUTING GRANULAR MATERIAL AND THE LIKE
George B. Wall, Delhi, Iowa, assignor to
Air-Spread, Inc., Delhi, Iowa
Filed July 15, 1969, Ser. No. 841,921
Int. Cl. A01c 15/04
U.S. Cl. 222—176                               11 Claims

ABSTRACT OF THE DISCLOSURE

An apparatus for distributing granular material such as fertilizer or salt-sand mixtures for ice control, by using air as the conveying medium and propelling force to distribute the material over a selected area. The apparatus is used on mobile equipment either in crop farming or in ice control for highways and streets.

BACKGROUND OF THE INVENTION

The extent of use of fertilizers in farming operations has increased tremendously in recent times. Fertilizers are commercially available in liquid, powder, and pellet form, and depending on the type of fertilizer, the apparatus for applying it to the soil differs. At the present time, it is the common practice to spread pelletized fertilized by loading a quantity of it in the hopper of a mobile unit, which unit has conveying means for moving the pellets from the hopper to a rotating distributing device which resembles the blades of a fan. The pellets are dropped onto the rotating blades of the distributor and the impact of the pellets with the blades propels the pellets in different directions. A spreader of this type is shown in U.S. Pat. No. 2,340,810. This deflection type of fertilizer spreader, however, does not distribute the fertilizer evenly nor will it distribute the fertilizer over a very large area. These problems arise because often the pellets disintegrate upon impact with the rotating distributor blades and the powder resulting from the disintegration of the pellets cannot be propelled. Moreover, if this type of spreader is used on a windy day, those pellets which disintegrate into a powder are often blown away and the effectiveness thereby lost. Also, it is almost impossible with spreaders of this type to control the area covered and the resulting unequal distribution results in waste in some areas and insufficient fertilizer in other areas.

Obviously, fertilizer spreaders of the deflection type are not suitable for distributing liquid fertilizer. Liquid fertilizers are customarily spread by spraying them on or injecting them into the soil with appropriate apparatus. Liquid spreaders customarily used perform a very adequate job of distributing the liquid fertilizer, but obviously an entirely different apparatus must be used to spread liquid as opposed to dry fertilizer. It both types are used on a particular soil, obviously two different types of spreaders must be used.

Deflection type spreaders are also used in ice control of streets and highways for spreading salt, sand or salt-sand mixtures. Also, there are known spreading devices which use air as a conveying medium for either distributing powdered fertilizers or spreading salt-and-sand mixtures. However, the design of these air conveying spreaders are such that the distribution patterns are not satisfactory, and when used on wagon-type spreaders where the power source comes from a prime mover such as a tractor, it is necessary to utilize a drive line the length of the wagon in order to power the spreading device. This adds to the expense of the spreading unit and also presents maintenance problems.

SUMMARY OF THE INVENTION

A spreader constructed according to the principles of applicant's invention can be utilized to spread any type of granular material, such as pelletized fertilizer, salt, sand or salt-sand mixtures. The spreader can also be utilized to spread liquid and powdered products. Regardless of the type of material being spread, applicant's spreader will distribute the material uniformly over an area which can be controlled. These advantages are accomplished by providing an elongated distribution duct which is divided into a series of smaller channels. The blower is located at the forward end of the duct upstream from the product inlet. The arrangement is such that when used with a wagon-type spreader pulled by a prime mover, all moving parts of the spreader are located near the power source, normally the power take-off unit of the prime mover. Moreover, the arrangement is such that the material to be distributed is sucked into each of the channels by the streams of moving air, thus assuring substantially uniform distribution of the material throughout the distributor duct and substantially greater uniformity in distribution of the material over the desired area. The basic design also lends itself to modifications which permit the fertilizing of groves of trees for example without fertilizing the area between the trees. When used in ice control of highways and streets, the apparatus of the invention can be used to spread the material over both sides of the highway even though the vehicle is driven down one side, thus, eliminating a double pass.

BRIEF DESCRIPTION OF THE DRAWINGS

FIG. 1 is a perspective view of a wagon-mounted hopper and spreader which incorporates the principles of the invention;

FIG. 2 is an exploded perspective view of the distribution duct with the inlet hopper removed, which duct forms part of the invention; and FIG. 3 is a top view of the material inlet to the distribution duct.

DESCRIPTION OF THE PREFERRED EMBODIMENT

In FIG. 1, there is illustrated a wagon-type spreader that is adapted to be pulled by a prime mover (not shown) such as a tractor. In such a case, the necessary power is derived from the prime mover, and usually the power take-off unit is utilized in a manner described hereinafter. However, it should be understood that the principles of the invention can be also applied and utilized very effectively by mounting the spreader on a truck thus eliminating the necessity of a separate prime mover. The use of a truck-mounted spreader would be more suitable, for example, in the case of ice control for streets and highways when a salt-and-sand mixture is being spread. Normally, however, the wagon-type spreader is used in farming operations where the material is spread over fields. With reference to FIG. 1, the wagon-type spreader includes a temporary storage means such as hopper 10 which has downwardly convergent side walls 12, a front wall 14 and a rear wall 16 all joined together as shown to provide a hopper preferably with an open top. The hopper 10 is mounted on a suitable supporting structure such as chassis 18 which in turn is mounted on two sets of wheels 20.

Along the bottom of the hopper 10 there is provided a conveyor 22 which extends from the rear wall 16 to a point beyond the front wall 14 and, therefore, terminating outside the hopper 10. The conveyor 22 is preferably of the type having an endless belt 24, and the hopper 10 is open along the entire length of its lower portion so that material in the hopper will, by force of gravity, always be fed onto the belt 24. The conveyor 22 can be located inside the hopper 10 or it can be a separate unit affixed beneath. If the latter, the conveyor 22 should be enclosed along its sides and at the rear end of the hopper 10. The specific designs of the hopper and the conveyor do not form a part of the invention, and many designs other than those illustrated may be used. As an example of the type of hopper-conveyor combination with which the invention can be used, there is shown in U.S. Pat. No. 2,340,810, issued on Feb. 1, 1944 to George Hoffstetter, a material spreader of the deflection type but which utilizes a mobile hopper-conveyor combination. It should be noted, however, that whereas the Hoffstetter patent shows the discharge opening in the rear wall of the hopper, applicant's invention requires the discharge opening to be in the front wall of the hopper for reasons explained more fully hereinafter.

The conveyor 22 can be powered in any suitable manner. It is well-known that such conveyors can be powered by mechanical connection to the wheels 20 of the wagon so that the conveyor will be driven at all times when the wagon is moving at a speed proportional to the wagon speed, but will stop whenever the wagon stops. Also, it is possible to power the conveyor independently by suitable connection to a power source on the prime mover (not shown) or by an independent power source such as a small internal combustion engine mounted on the wagon. The specific way in which the conveyor is powered forms no part of the invention. It is only important to the invention that some conveying means be provided to continuously discharge material from the front end of the hopper 10.

The front wall 14 of hopper 10 is preferably provided with a vertically movable gate 26 which can be moved to a number of different positions to regulate the size of a discharge opening 25 and thereby control the amount of the material discharged from the hopper 10 by conveyor 22.

Mounted beneath the conveyor 22 is a longitudinally extending material distribution means indicated generally by the reference numeral 28. As best seen in FIG. 2, the distribution means is an elongated duct 28 which has dividers 29 that form a plurality of separate channels through which air is passed. The duct 28 has a main central portion 30 which is of substantially uniform width throughout and of a width approximately the same as the discharge opening 25 in the front wall 14 of hopper 10. As indicated in the drawings, the height of the main portion 30 increases slightly from the material inlet 32 directly beneath the discharge end of conveyor 22 to a point 34 near the rear of the hopper 10. The terminal portion 38 of duct 28 terminates in a discharge opening 36, and from point 34 to the discharge opening 36 the terminal portion 38 diverges outwardly in width while it decreases in height. A top plate 40 encloses duct 28 and the channels formed by dividers 29. The dividers 29 separate the central portion 30 into a plurality of longitudinally extending channels each of which is substantially uniform in cross-sectional area throughout the length of the central portion 30. For reasons set forth hereinafter, it is important that the cross-sectional area of each channel remain the same or increase slightly from the inlet 32 to point 34. The dividers 29 are continuous from the central portion 30 through the terminal portion 38, but from point 34 the dividers 29 diverge, as best shown in FIG. 2. The diverging dividers 29 thus divide the discharge opening 36 into a plurality of smaller openings the size of which are of greater width than the width of the channels at the inlet 32. However, since the height of the duct 28 decreases from the point 34 to the discharge opening 36, the cross-sectional area of the individual discharge openings of the channels is only slightly greater than the cross-sectional area at the material inlet 32. Obviously, the design and dimensions of the distribution duct 28 can be made so that the cross-sectional area would remain substantially equal throughout the length of the duct 28. It is preferable, however, that the cross-sectional area of each channel be increased slightly from the inlet 32 to the discharge 36 so that the pressure of the moving air will be lowest at the inlet 32 and thereby provide a suction effect to draw material into the duct.

The air inlet portion 42 of the distribution duct 28 is substantially reduced in height from the central portion 30, thus, forming a vertical shoulder 43 at the material inlet 32. This abrupt change in the size of duct 28 further contributes to the "venturi" effect thus providing a low pressure area at inlet 32. The air inlet 42 is connected at its forward-most end to an air moving means such as a fan or blower 44 which is mounted on the forward end 46 of chassis 18, which end 46 provides a tongue for connection to the prime mover. The blower 44 is driven from any suitable power source, and in the case of a wagon-type unit pulled by a prime mover, the blower 44 would usually be driven by connection to the power take-off unit (not shown) of the prime mover. This could be done, for example, by connecting the power take-off unit to a gear box 48 which in turn is connected to the blower 44 by a belt 50 or other suitable power transmission means. The specific way in which the blower 44 is driven forms no part of the invention.

The air inlet portion 42 of the distribution duct 28 is completely enclosed as shown. The dividers 29 may be continued through portion 42 or terminate at the inlet 32. As shown in the drawings, the vertical shoulder 43 is formed at the juncture of inlet 42 with the central portion 30. Because of dividers 29, inlet opening 32 presents a plurality of vertical inlet openings. To guide the material from the conveyor 22 into these inlet openings leading to the distribution channels, the inlet openings are positioned directly beneath the discharge end of the conveyor 22, and a hopper 52 containing dividers 53 is mounted at the end of the conveyor. This is best seen in FIG. 3 and dividers 53 correspond to dividers 29 so that the material will be split into the channels for distribution at the time the material is discharged from conveyor 22. Thus, with the blower 44 operating and thus forcing air through the channels formed by dividers 29 within the distribution duct 28, a suction effect will be created at the material inlet 32. When material to be spread is discharged from the conveyor 22, it will, therefore, be sucked into the channels within the distribution duct 28 and projected out the discharge openings 36 at approximately the same velocity as the velocity of the moving air.

There are several features which make a spreader constructed according to the invention an extremely effective spreading apparatus. The dividers 29, which form the channels within the distribution duct 28, extend continuously from the material inlet 32 to the discharge opening 36 of the duct 28. Thus, within each channel, the blower 44 will create a relatively high velocity stream of air with a minimum of turbulence. Because of the design of the distribution duct 28 with the smaller inlet 42 and the construction of each channel so that it is somewhat uniform or slightly increases in cross-sectional areas from the material inlet 32 to the material dicharge opening 36, the moving air will create a suction at the inlet 32 and draw the material from the conveyor 22 into the duct 28. With a blower 44 of proper design, the air velocity will be high enough at the discharge opening 36 to project the material to be spread a considerable distance. Particularly, where granular or pellet type material is being spread, each individual particle is literally "shot" out of the discharge end of the distribution duct 28. Thus, a single pass with the spreader will distribute material over an area of considerable size thus greatly speeding up the spreading process. Contributing to the ability of a spreader utilizing the principle of the invention to spread material over a large area is the length of the distribution duct 28. The effect thus created can be likened to the length of the barrel of a shotgun.

Also important is the uniformity of distribution of the material being spread. This is especially important where fertilizer is being spread. This uniformity is made possible partly because the dividers provide channels which extend all the way from the material inlet to the discharge end. Also, because of the suction effect at the inlet 32, the material will tend to be drawn evenly into all of the channels of the distribution duct 28.

Another feature of the invention is the simplicity of its operation and the minimum number of moving parts. As compared to a spreader of the type shown in Hoffstetter Pat. No. 2,340,810, the simplicity is obvious. By providing the blower at the front end of the spreader, the necessity for a drive line running from front to rear of the spreader is eliminated. This, thus, eliminates a considerable part of the cost of the unit as well as minimizing maintenance problems.

As previously indicated, with minor variations in the design, the principle of the invention can be utilized to spread pelletized, granular or powdered fertilizer, or salt, sand, and salt-sand mixtures. By varying the dimensions and angles of the discharge end of the distribution duct, it is obvious that when used on streets and highways, the material can be directed to any number of lanes of traffic with a single pass of the spreader. By proper design and dimensioning, fairly accurate control of distribution of the material is possible with a spreader utilizing the principles of the invention. Moreover, when the spreader is utilized to spread fertilizer or other material in grooves of trees where the material must be spread to one or both sides of the spreader as it moves between rows, certain of the central passageways can be blocked off at the inlet end with the result that the material will be distributed only to the sides of the spreader with none being distributed in the middle.

It should also be noted that it is possible using the principles of the invention to spread liquid materials such as liquid fertilizer. With proper design, liquid can be easily conveyed in a moving air stream and efficiently and effectively distributed. Thus, the principles of the invention have varied application. It will, therefore, be obvious to those skilled in the art that many modifications and variations can be made to the preferred embodiment described herein without departing from the spirit and scope of the invention. It is my intention, however, that all such revisions, modifications and variations shall be included within the scope of the following claims.

I claim:

1. In a mobile spreader for bulk material and the like having a chassis mounted on wheels supporting the spreader, an apparatus for distributing said bulk material and the like, said apparatus comprising material storage means having a discharge opening, an elongated enclosed material distribution means below said storage means and extending from front to rear of said apparatus, said material distribution means having a material inlet positioned near the discharge opening of said storage means to receive material discharged therefrom, said material distribution means also having a material outlet located a substantial distance downstream from said inlet, means upstream from said material inlet for causing air to move through said distribution means and to be discharged through said outlet, means providing for controlled discharge of material in said storage means through said discharge opening, and means dividing said distribution means into a plurality of material-carrying passageways extending continuously from the material inlet to the outlet of said distribution means.

2. The apparatus of claim 1 in which said passageways extend along substantially straight, parallel paths most of their length and then diverge to the point of said outlet.

3. The apparatus of claim 1 in which the cross-sectional area of each of said passageways is at least as large at the material outlet as it is at the material inlet.

4. The apparatus of claim 2 in which the cross-sectional area of each of said passageways is at least a large at the material outlet as it is at the material inlet, the height of said passageways decreasing gradually as they diverge.

5. The apparatus of claim 1 in which the material distribution means has a vertical shoulder formed near the discharge opening of said storage means, said material inlet is formed in said vertical shoulder, and there is provided means for guiding the material discharge from said storage means into said material inlet.

6. In a mobile spreader for bulk material and the like having a chassis mounted on wheels and supporting a material hopper, an apparatus for distributing said material to the rear of the spreader as it moves, said apparatus comprising, conveyor means for moving said material to the forward end of said hopper, means for allowing controlled amounts of said material to be discharged from the forward end of said hopper, an enclosed material distribution means extending beneath said hopper from its forward end to the rear thereof, said material distribution means having a material inlet positioned near the forward end of said hopper to receive material discharged therefrom and a material outlet terminating near the rear of said hopper, means upstream from said material inlet for causing air to move through said distribution means and to be discharged through said outlet, and means dividing the interior of said distribution means into a plurality of passageways extending continuously from the material inlet to the outlet of said distribution means.

7. In the mobile spreader of claim 6, in which said passageways extend along substantially straight, parallel paths from the material inlet to a point near the rear of said hopper and then diverge and terminate in said outlet.

8. In the mobile spreader of claim 6 in which the cross-sectional area of each of said passageways is at least as large at the material outlet as it is at the material inlet.

9. In the mobile spreader of claim 7 in which the cross-sectional area of each of said passageways is at least as large at the material outlet as it is at the material inlet, the height of said passageways decreasing gradually as they diverge.

10. In the mobile spreader of claim 6 in which the material distribution means has a vertical shoulder formed near the forward end of said hopper, said material inlet is formed in said vertical shoulder, and there is provided means for guiding the material discharged from said hopper into said material inlet.

11. An apparatus for distributing bulk material and the like, said apparatus comprising material storage means having a discharge opening, an elongated enclosed material distribution means having a material inlet position near the discharge opening of said storage meas to receive material discharged therefrom, said material distribution means also having a material outlet located a substantial distance downstream from said inlet, means upstream from said material inlet for causing air to move through said distribution means and to be discharged through said outlet, the cross sectional area of said material distribution means immediately upstream from said material inlet being less than the cross sectional aera of said material distribution means at said outlet so as to create a low pressure area at said inlet to suck material through said inlet into said material distribution means, and means dividing said material distribution means into a plurality of passageways each extending continuously from the material inlet to the outlet of said distribution means.

References Cited

UNITED STATES PATENTS

| | | | |
|---|---|---|---|
| 36,073 | 8/1862 | Clark | 239—654X |
| 1,373,317 | 3/1921 | Edwards | 222—193X |
| 2,187,376 | 1/1940 | Guibert | 222—193 |
| 2,476,465 | 7/1949 | Tarrant | 239—654 |
| 2,574,159 | 11/1951 | Tarrant | 222—193X |
| 3,013,695 | 12/1961 | Caldwell, Jr. | 222—193X |

M. H. WOOD, Jr., Primary Examiner

J. J. LOVE, Assistant Examiner

U.S. Cl. X.R.

222—193; 239—654